United States Patent [19]

Bekedam

[11] Patent Number: 4,874,406
[45] Date of Patent: Oct. 17, 1989

[54] JET SPRAY ATMOSPHERIC DEAERATOR

[76] Inventor: Martin Bekedam, 103 Brookline, Moraga, Calif. 94556

[21] Appl. No.: 276,926

[22] Filed: Nov. 28, 1988

[51] Int. Cl.⁴ ............................................. B01D 19/00
[52] U.S. Cl. ..................................... 55/198; 239/571; 137/529
[58] Field of Search .................... 55/39, 196, 198, 201, 55/202, 165, 167, 190; 122/488, 489; 239/571; 137/529

[56] References Cited

U.S. PATENT DOCUMENTS

| | | | |
|---|---|---|---|
| 1,797,405 | 3/1931 | Elliott | 55/39 |
| 2,078,828 | 4/1937 | Sherman | 55/39 |
| 2,671,524 | 3/1954 | Gilwood | 55/39 |
| 2,689,018 | 9/1954 | Kittredge | 55/39 |
| 3,291,105 | 12/1966 | Stenard | 55/198 |
| 3,487,611 | 1/1970 | Bekedam | 55/39 X |
| 4,385,908 | 5/1983 | Carmichael | 55/39 |
| 4,445,537 | 5/1984 | Athey et al. | 55/39 X |
| 4,624,686 | 11/1986 | Andrieux et al. | 55/196 |
| 4,698,076 | 10/1987 | Bekedam | 55/39 |

FOREIGN PATENT DOCUMENTS

| | | | |
|---|---|---|---|
| 28664 | 5/1981 | European Pat. Off. | 55/201 |
| 945556 | 7/1982 | U.S.S.R. | 137/529 |
| 932054 | 7/1963 | United Kingdom | 55/39 |

OTHER PUBLICATIONS

SR.03 Deaerator, 3.2, Industrial Steam, Inc., 4 page brochure, Jul. 1976.
.005 Pressurized Jet Spray Deaerator 2.2, Kewanee Boiler Corporation, 7 page brochure, Bulletin 2.2-3/84.
.03 Spray Flow Deaerator 3.1, Industrial Steam, 4 page brochure, Apr. 1979.
.005 Pressurized Steam Flow Deaerator 2.1, Industrial Steam, 4 page brochure, Apr. 1979.
.005 Spray Flow Deaerator 4.1, Industrial Steam, 4 page brochure May 1977.
.03 and .005 Deaerators, Sellers Engineering Company, brochure dated Jan. 1985.

Primary Examiner—Bernard Nozick
Attorney, Agent, or Firm—Bielen and Peterson

[57] ABSTRACT

A jet spray atmospheric deaerator unit having a vessel divided into an atmospheric section and a low pressure section, the low pressure section containing a jet spray deaerator valve connected to a steam supply line arranged with a water collection tray for deaerating water dispensed from the tray, the collection tray receiving water from the atmospheric section through a water circulating line which sprays water over the tray to purge steam from an open gas vent line communicating between the low pressure section and the atmospheric section, the atmospheric section having a vent open to atmosphere with a vent condenser to purge vented non-condensible gases from the atmospheric section, and, the low pressure section being pressure protected by a water column conduit communicating between the vessel sections to return overflow water and blow through excess pressurized gas.

19 Claims, 2 Drawing Sheets

JET SPRAY ATMOSPHERIC DEAERATOR

BACKGROUND OF THE INVENTION

This invention relates to an atmospheric deaerator unit for use in a boiler feed water system for eliminating non-condensable gases from boiler feedwater. Non condensable gases are principally carried into the feedwater system by the addition of makeup water for compensation of losses during the steam cycle. Additionally, gases can be generated in the steam circuit such as carbon dioxide which is generated from carbonate salts reacting with metallic components in the steam circuit.

The jet spray atmospheric deaerator of this invention is of the type described in my prior U.S. Pat. No. 4,698,076 issued October 6, 1987, entitled ATMOSPHERIC DEAERATOR UNIT, and in my U.S. Pat. No. 3,487,611 issued January 6, 1970, entitled SPRAY-FLOW DEAERATOR. Generally, deaerators are rated as either 0.03 cc/liter or 0.005 cc/liter deaerators. The latter being the most effective in removing desolved gases. In general, to achieve a reduction of dissolved air and gases to 0.005 cc/liter, the deaerator must operate in a pressurized circuit. While the referenced patent entitled ATMOSPHERIC DEAERATOR UNIT, discloses one arrangement for achieving a high performance deaerator at atmospheric pressure, the deaerator of this invention provides an alternate solution for the problem of obtaining a high performance deaerator that is vented to atmosphere. Atmospheric deaerators are preferred for their safety features and their low cost in maintaining vessels at low temperatures.

The deaerator unit of the present invention is constructed with a divided vessel in which one side is steam pressurized to less than 1 psi. This small pressure differential allows for internal deaeration circuits that substantially reduce the venting of any steam without the various temperature controls required in my prior atmospheric deaerator system.

SUMMARY OF THE INVENTION

The deaerator unit of this invention is an atmospheric deaerator with a divided water vessel that includes a slightly pressurized section in order to maximize deaeration and minimize the loss of steam through the atmospheric vent. By dividing the deaerating unit into separate pressurized and atmospheric sections and in using mixing trays isolated from the water reservoirs, a high level of deareation can be accomplished.

The deaeration unit of this invention is particularly suitable for industrial processing equipment in which steam demand and condensate return may be irregular. The deaerating unit may be used in combination with select heat exchangers and flash condensers to maximize efficiencies in the water and steam circuit.

The deaerator unit is constructed with an outer vessel or drum having an internal divider dividing the vessel into two substantially equal sections. One section is maintained slightly pressurized by incoming steam used in the deaeration process. The incoming steam is regulated by a pressure control valve pre-set to a low vessel pressure. Communication between the pressurized deaerating section and the atmospheric mixing section is by a restricted gas vent that purges any non-condensable gases from the deaerating section. The restricted gas vent is continuously open and leads non-condensable gases and some past steam to the mixing section where the past steam is recovered and the gases vented.

A stand pipe also communicates between the deaerating section and the mixing section. The stand pipe acts as a level overflow and an emergency pressure relief. Normally the water in the standpipe has a level in the deaerating section that is depressed because of the pressurization. However, if the pressure becomes excessive the water is blown through the pipe into the mixing section thereby providing a clear path for pressure relief since the mixing section is vented to atmosphere.

The mixing section has an atmospheric vent that is protected by a vent condenser that sprays a conically shaped spray of relatively cool water from either the makeup water supply or the bottom of the mixing section. The spray water is collected on a mixing tray arranged below the vent condenser where it is heated by incoming return condensate that also is disposed in the mixing tray. Overflow from the mixing tray falls to the general water reservoir in the mixing section for transfer to the deaerating section in a continuous process.

A small transfer pump delivers water from the mixing section through a similar vent condenser in the deaerating section that also includes a collection tray below the condenser. Non-condensable gases that pass the vent condenser are, as noted, transferred back through the restricted gas vent to the mixing section. Water from the collection tray is deaerated by an improved steam atomizer. The steam atomizer preheats the water in the tray by contact with the steam delivery tube. The water that exits the tray against the steam tube is atomized and further heated by direct contact of the high velocity steam that is discharged across a flat plate onto which the exiting water descends. The highly atomized and heated water releases absorbed gases that are scrubbed of steam by the vent condenser before transfer to the mixing section as previously described.

The dual stage vent condenser substantially eliminates the venting of any steam. Similarly, the dual tray system provides for a two stage deareation wherein the water in the mixing section is continuously mixed with return condensate from the associated processing equipment such that the water is elevated in temperature to release non condensable gases that are either returned with the condensate or introduced with the makeup water. The present system achieves its high degree of efficiency in deaeration without the close tolerance temperature controls required in my earlier atmospheric deaerator unit described in the referenced patent. These and other improvements will become apparent from a consideration of the detailed description of the preferred embodiments.

DETAILED DESCRIPTION OF THE PREFERRED EMBODIMENTS

Figure 1:
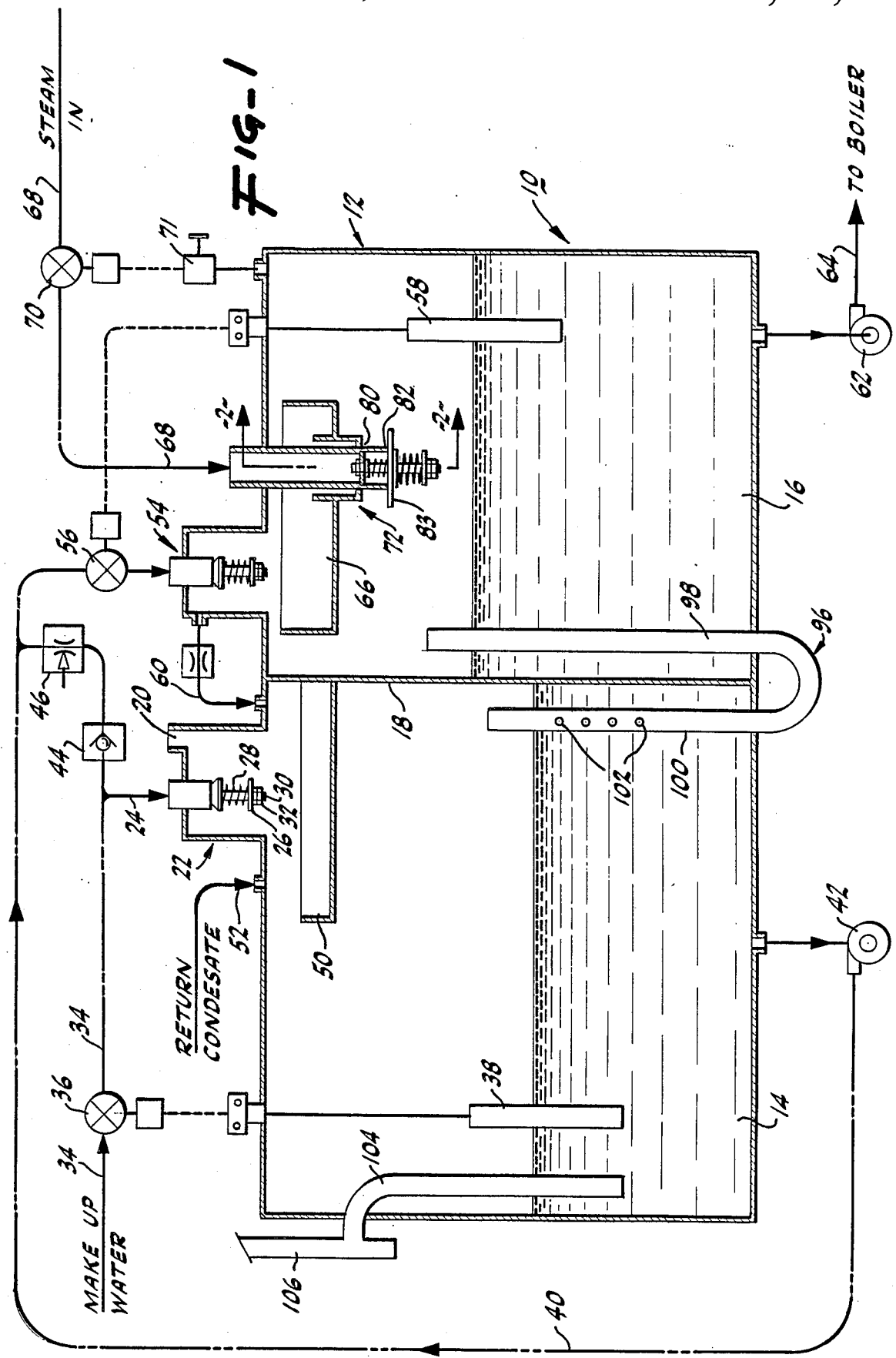
FIG. 1 is a cross sectional view partially schematic of the deaerator unit.

The jet spray atmospheric deaerator of this invention is shown in FIG. 1 and designated generally by the reference numeral 10. In its preferred embodiment the deaerator has a unitary vessel 12 that is divided into two sections or compartments, a mixing section 14 and a deaerating section 16 separated by a divider 18.

The deaerator section forms a compartment that is maintained at a slight positive pressure of under one pound, and the mixing section forms a compartment that is maintained at atmospheric pressure and is directly vented to the atmosphere through a vent 20. The vent is shielded by a vent condenser 22, which is a unit that includes a water supply line 24 with a small dispersion plate 26 that is urged against the end of the water supply line by a spring 28 retained on a stem 30 by an adjustment nut 32. The stem is fastened to the inside of the water supply line by a web (not visible). By manipulation of the nut 32 the force required to displace the dispersion plate 26 from the end of the water supply line can be adjusted. Make up water from an external source (not shown) under pressure is supplied through a make up water line 34 that connects to the water supply line 24. A regulator valve 36 in the make up water line is monitored by a level control 38 in the mixing section which opens the control valve when water falls below a predetermined level.

Also connected to the water supply line 24 is a water circulation line 40 that draws water from the bottom of the mixing section 14 by a transfer pump 42 and circulates the water to the water supply line through a check valve 44. The check valve 44 prevents make up water from mixing with the circulation water in the event the control valve 36 in the make up water line is open.

In addition to the check valve 44, the water circulation line 40 includes an adjustable flow restricter 46 to allow a predetermined continuous flow to be delivered to the vent condenser to provide a continuous fan shaped spray in the vent condenser. In this manner, non-condensable gases can pass through the spray in the vent condenser whereas any mist or vapor from flashed condensate or any entrained steam will be condensed by contact with the spray.

To maximize deaeration, a mixing tray 50 is positioned immediately below the vent condenser 22. The mixing tray receives the sprayed water from the water circulation line 40 and the makeup water line 34 as well as any return condensate through a condensate line 52. Since the return condensate may be at a flash temperature, any flash steam generated by the return condensate is cooled by the water spray in the area above the tray and condensed while the spray water is heated. The remaining condensate falls to the mixing tray to further heat the water in the mixing tray resulting in the release of the non-condensable gases.

As noted, the non-condensable gases pass through the water spray and out the vent. In addition to delivering circulation water to the vent condenser in the mixing section, the circulating water line delivers water to a second vent condenser 54 in the deaerating section. Delivery of water from the mixing section to the deaerating section is controlled by an electronic regulator valve 56 that is controlled by a level control 58 in the deaerating section. The second vent condensor 54 is identical in construction to the first vent condenser 22 except that it does not have an atmospheric vent but rather has a gas venting line 60 which allows flow of gas from the top of the second vent condenser to the top of the mixing section. The gas vent line is small enough in diameter that it continuously bleeds gases from the deaerating section, which is under pressure, to the mixing section. In general the deaerating section continously supplies water to the boiler by a boiler feed pump 62 through a boiler feed line 64 thus resulting in a continous supply of water through the vent condenser from the mixing section. In the event that the level control closes the regulator valve 56 halting the spray in the vent condenser 54, any vapor that may pass through the gas vent line 60 to the mixing section will be condensed in the mixing section.

Figure 2:
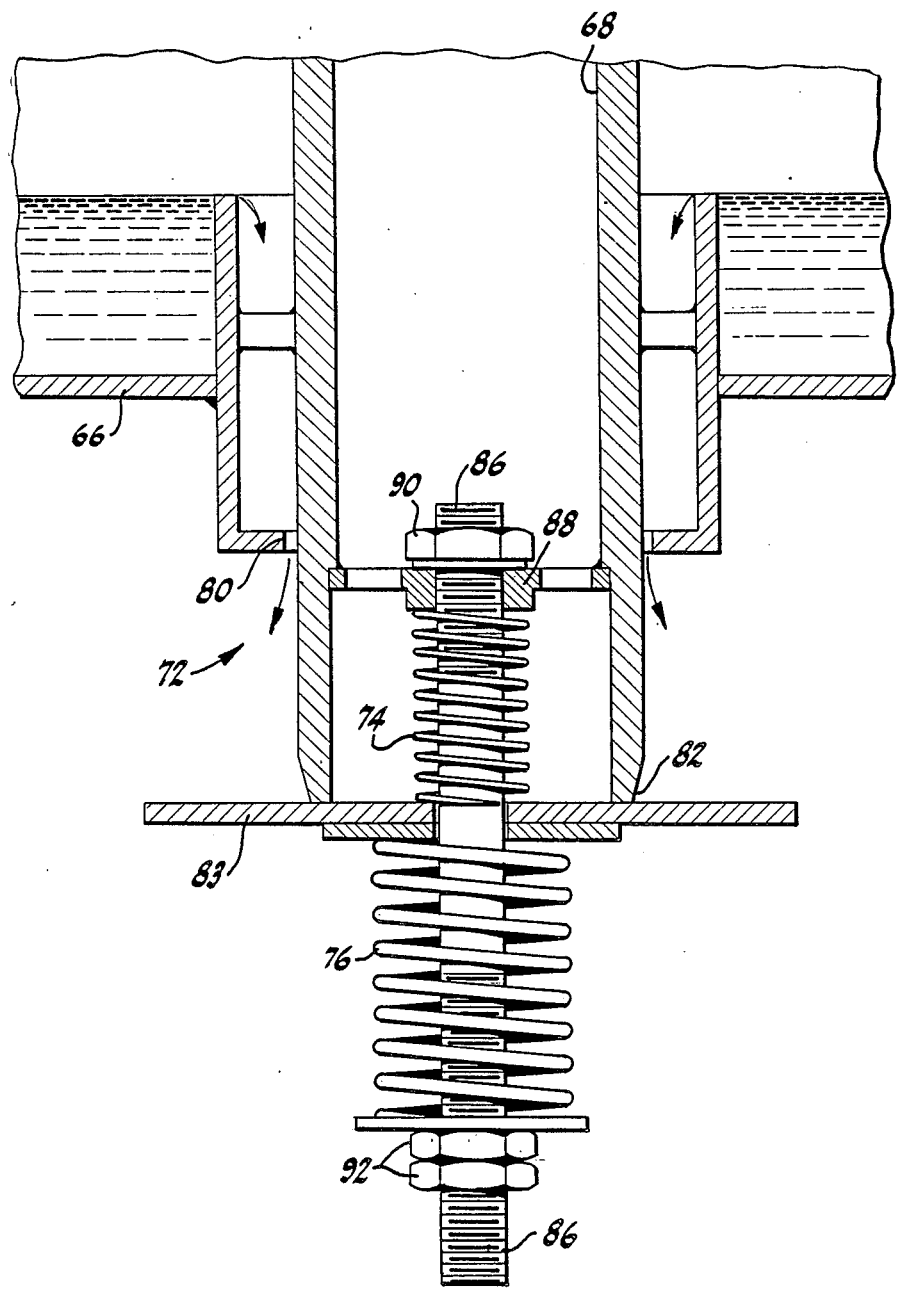
FIG. 2 is an enlarged cross sectional view of a component in FIG. 1.

Spray water supplied from the mixing section to the second vent condenser section 54 falls to a collection tray 66 where it is fully deaerated by a steam jet. Steam is supplied from the boiler through a steam line 68 through a steam control valve 70 having a preset control 71 set to supply sufficient steam to the deaerating section to maintain the pressure in the deaerating section at approximately 1 psi or less. The setting of the valve 70 provides for supply of a controlled quantity of steam such that the steam jet is relatively continuous in operation. Because of the throttling affect of the valve 70 the steam jet deaerator valve 72 at the end of the steam line 68 tends to chatter unless improved by the addition of a damping spring 74 which opposes the main closure spring 76 as shown in greater detail in FIG. 2.

It has been discovered that the steam jet deaerator valve or steam atomizing valve as described in my prior patent entitled ATMOSPHERIC DEAERATOR UNIT tends to vibrate or chatter under low pressure differentials. In situations where the control valve is regulated by a sensor in the steam line between the control valve and the steam deaerator valve no chatter will result since the pressure differential between the deaerator and the control segment of the steam line is clearly defined. However, when the control line sensing pressure is connected to the deaerator then the pressure differential on both sides of the deaerator valve is relatively the same for a sustained duration of time. The addition of a damping spring to oppose the stronger main valve spring eliminates this undesirable chatter by supplying a defined opposing force to the main spring. In other respects, the steam jet deaerator valve 72 is similar in construction to my prior device. An annular water passage 80 allows a stream of water to descend against the end 82 of the steam line 68 to a flat dispersement plate 83, which when displaced from the end of the steam line, allows the water to be blasted by the jet of steam and atomized. As the water descends against the steam line 68 it is initially heated by steam in the line and finally heated directly by the steam jet when it is disbursed into the deaerating section. The heating and atomization of the partially deaerated water from the collection tray 64 completes the deaeration before the water collects in the reservoir of the deaerating section of vessel.

The steam jet deaerator valve 72 is internally mounted in the steam line 68 by a stem 86 threaded into a support web 88 and locked by adjustment nut 90. Adjustment of the main spring is provided by end nuts 92 allowing the jet valve to be adjusted to open at a specific steam pressure at the end of the steam line. The spring constant of the damping spring 74 is substantially less than the spring constant of the main spring 76. Since the springs will be selected in part depending on the line pressure and deaerator pressure involved and since the valve can be used on other equipment where higher line pressures are required, selection of the springs will not be the same for all conditions. The spring constant of the damping spring, however, will be approximately one third of the spring constant of the main spring.

The nominal pressure maintained in the deaerating section is prevented from exceeding any design limits by a U-tube 96 having a stand pipe segment 98 positioned in the deaerating section and a perforated section 100 positioned in the mixing section. The U-tube both provides a water overflow and a pressure blown down tube. When the water level exceeds the end of the pipe, the water will drain into the U-tube and be returned to the mixing section. Because of the slight pressure in the deaerating section, the water level in the stand pipe will be slightly less than the water level in the deaerating section under normal conditions. If pressure becomes excessive the water can be blown through the U-tube and into the mixing section which is vented to the atmosphere. Upon relief of any pressure water can refill the tube through the perforations 102. To prevent the water level in the mixing section from exceeding a maximum level, the mixing section includes an overflow tube 104 that is vented to the atmosphere by vent tube 106 to prevent a siphon action from discharging an excess quantity of water from the mixing section.

With these safety features, the deaerator can be rated as an atmospheric deaerator. By use of the divided vessel and the slight pressure differential, however, the deaerator can allow for continuous flow that gradually improves the deaeration of the water introduced into the boiler system such that the overall effectiveness of the atmospheric deaerator is equivalent to high performance pressurized deaerators. By constructing the deaerator with stainless steel components including the vessel itself, the deaerator unit itself does not contribute to any non-condensable gases resulting from a corrosion process. Water collected and stored in the deaerating section therefore is maintained at a high level of degasing such that vapor lock in either the deaerator or the boiler system is avoided.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An atmospheric jet spray deaerator unit comprising:
   a first vessel means for containing a quantity of water at atmospheric pressure, the first vessel means having a vent means for venting the first vessel means to atmosphere;
   a second vessel means for containing a quantity of water under pressure slightly higher than atmospheric pressure, the second vessel means having a steam jet deaerator means for deaerating water in the second vessel means;
   a safety means communicating between the first vessel means and the second vessel means for releasing excess pressure in the second vessel means to the first vessel means;
   a non-condensible gas relief means for passing non-condensible gases from the second vessel means to the first vessel means;
   water circuit means for circulating water from the first vessel means to the steam jet deaerator means in the second vessel means, circulating water from the second vessel means to a boiler and receiving condensate in the first vessel means from the boiler wherein the steam jet deaerator means includes a steam conduit with a steam jet deaerator valve at the end of the conduit, the valve having a dispersion plate with first spring means for urging the dispersion plate against the end of the conduit and second spring means for urging the dispersion plate away from the end of the conduit, wherein the force of the first spring means is greater than the second spring means.

2. The unit of claim 1 wherein the vent means includes a water spray nozzle to purge vented non-condensible gases of water vapor and steam.

3. The unit of claim 1 wherein the safety means comprises a U-shaped water column conduit communicating between the first and second vessel means with a stand pipe segment in the second vessel means and a perforated pipe segment in the first vessel means, said stand pipe segment providing a water overflow for water in the second vessel means to the first vessel means and a blow down pipe for pressure release through the water column conduit from the second vessel means to the first vessel means.

4. The unit of claim 1 wherein the jet deaerator means includes further steam supply means for supplying pressurized steam to the steam conduit and a water supply means associated with the water circuit means for supplying water to the dispersion plate and dispersing water in a spray using steam from the steam supply means.

5. The unit of claim 4 wherein the water supply means for supplying water to the dispersion plate includes a water collection tray positioned in the second vessel means around the steam conduit with a water release passage around the conduit, and the gas relief means includes a vent condenser means with a water spray arranged above the water tray and a vent line connecting the second vessel means with the first vessel means for purging gases vented to the first vessel means of water vapor and steam, wherein the water spray is arranged to direct water spray downwardly into the collection tray.

6. The unit of claim 5 wherein the steam conduit is connected to a steam supply means regulated by a pressure control means for supplying steam to the second vessel means according to pressure in the second vessel means.

7. The unit of claim 1 wherein the first and second vessel means include water level control means for maintaining the quantity of water at predetermined levels and wherein the gas relief means comprises a constricted gas flow conduit means connecting the first vessel means to the second vessel means above the water levels for continuously passing gas from the second vessel means to the first vessel means.

8. The unit of claim 7 wherein the gas flow conduit means is arranged with a water spray connected to the water circulating means for purging vapor and steam from gas flowing to the gas flow conduit.

9. In a jet spray deaerator unit having a steam conduit and a steam supply to the steam conduit an improved jet spray deaerator valve mounted at the end of the steam conduit comprising:
   a support stem mounted at the end of the steam conduit with an internal portion with a first end inside the conduit and a external portion projecting from the end of the conduit with a second end outside the conduit;
   a dispersion plate slidably engageable with the support stem and arrangeable on the stem against the end of the steam conduit to block the flow of steam in the conduit;

a first bias spring having first and second ends mounted on the inside portion of the stem, the stem having a retainer at its first end, and the dispersion plate having first and second sides, wherein the first bias spring has its first end positioned against the retainer and its second end positioned against the first side of the dispersion plate; and a second bias spring having first and second ends mounted on the outside portion of the stem, the stem having an adjustable retainer at its second end wherein the second bias spring has its first end positioned against the adjustable retainer and its second end positioned against the second side of the dispersion plate, wherein the second bias spring has a bias force greater than the first bias spring to inhibit chatter of the dispersion plate against the steam conduit.

10. The improved valve of claim 9 in combination with a water collection tray mounted around the steam conduit above the deaerator valve, the collection tray having an annular water discharge passage around the steam conduit for discharging water to the dispersion plate.

11. An atmospheric jet spray deaerator unit comprising:

a first vessel compartment having an unrestricted vent that directly vents the first compartment to atmosphere, the first vessel compartment constructed to contain a quantity of partially deaerated water, and the vent having means to purge vented gases of water vapor and steam;

a second vessel compartment having a steam supply means for supplying steam to the second vessel compartment, the second vessel compartment having means associated with the steam supply means for maintaining a low positive pressure in the second vessel compartment, the second vessel compartment being constructed to contain a quantity of deaerated water and the means for maintaining a low positive pressure in the first vessel compartment including a steam supply conduit entering the second vessel compartment with a control valve and pressure sensing means in the second vessel compartment for sensing pressure in the second vessel compartment and regulating the control valve to supply pressurized steam according to a predetermined pressure in the second vessel compartment.

12. The deaerator unit of claim 11 wherein the first vessel compartment and the second vessel compartment comprise a single vessel with a central divider.

13. The deaerator unit of claim 12 wherein the steam supply means includes a jet spray deaerator at the end of the steam conduit.

14. The deaerator unit of claim 13 wherein the jet spray deaerator includes a water collection tray mounted around the steam conduit with a narrow water escape passage adjacent the conduit and a steam jet deaerator valve at the end of the conduit below the tray, the deaerator valve having a dispersion plate, a valve stem mounted to the conduit, a valve spring seated on the valve stem in engagement with the dispersion plate urging the dispersing plate against the end of the stem conduit, and a damping spring mounted on the valve steam inside the conduit in engagement with the dispersion plate opposite the valve spring wherein the damping spring opposes the valve spring to reduce chatter of the dispersion plate against the end of the conduit.

15. The deaerator unit of claim 12 wherein the water spray means of the vent line includes a water circulation line from the first compartment and a spray nozzle in the second compartment at the end of the water circulation line, wherein the circulating means circulates water through the water circulation line and into the second compartment and the circulating means includes water level sensing means and valve means for controlling the water level in the second compartment and the water flow through the water circulation line.

16. The deaerator unit of claim 15 wherein the steam supply means includes a steam conduit entering the second vessel compartment, a jet spray deaerator at the end of the steam conduit and a water collection tray around the steam conduit above the jet spray deaerator.

17. The deaerator unit of claim 16 wherein the water collection tray in the second compartment is arranged below the water spray means of the vent line and collects water sprayed from the spray nozzle.

18. An atmospheric jet spray deaerator unit comprising:

a first vessel means for containing a quantity of water at atmospheric pressure, the first means having an unrestricted vent means for venting the first vessel means to atmosphere, the vent means including a water spray nozzle to purge vented non-condensible gases of water vapor and steam;

a second vessel means for containing a quantity of water under pressure slightly higher than atmospheric pressure, the second vessel means having a steam jet deaerator means for deaerating water in the second vessel means, the steam jet deaerator means including a steam supply conduit having a steam discharge valve with a water dispersement element and means for supplying water at the dispersement element in contact with steam discharged from the steam supply conduit, and, steam supply regulating means with a pressure sensing means for sensing pressure in the second vessel means and controlling the regulating means to maintain a predetermined pressure in the second vessel means by pressurized steam supplied to the second vessel means;

a safety means communicating between the first vessel means and the second vessel means for releasing excess pressure in the second vessel means to the first vessel means;

a non-condensible gas relief means for passing non-condensible gases from the second vessel means to the first vessel means that includes a constricted gas flow conduit means having a water spray nozzle in the second vessel means for purging passed gases of water vapor and steam; and, water conduit means for circulating water from the first vessel means to the steam jet deaerator means in the second vessel means, circulating water from the second vessel means to a boiler and receiving condensate in the first vessel means from the boiler.

19. An atmospheric jet spray deaerator unit comprising:

a first vessel means for containing a quantity of water at atmospheric pressure, the first vessel means having a vent means for venting the first vessel means to atmosphere;

a second vessel means for containing a quantity of water under pressure slightly higher than atmospheric pressure, the second vessel means having a steam jet deaerator means for deaerating water in the second vessel means;

a safety means communicating between the first vessel means and the second vessel means for releasing excess pressure in the second vessel means to the first vessel means wherein the safety means comprises a U-shaped water column conduit communicating between the first and second vessel means with a stand pipe segment in the second vessel means and a perforated pipe segment in the first vessel means, said stand pipe segment providing a water overflow for water in the second vessel means to the first vessel means and a blow down pipe for pressure release through the water column conduit from the second vessel means to the first vessel means;

a non-condensible gas relief means for passing non-condensible gases from the second vessel means to the first vessel means; and, water circuit means for circulating water from the first vessel means to the steam jet deaerator means in the second vessel means, circulating water from the second vessel means to a boiler and receiving condensate in the first vessel means from the boiler.

* * * * *